Oct. 10, 1961 R. M. FERRIS ET AL 3,003,472
QUILL ACTUATING AND CLAMPING MECHANISM
Filed Sept. 14, 1959 2 Sheets-Sheet 1

INVENTORS
Robert M. Ferris
Denison C. Miller
BY
Emery J. Wintschel
Attorney

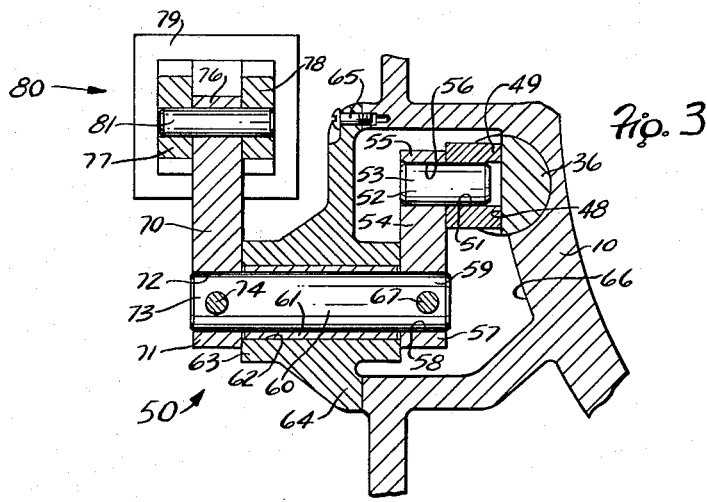
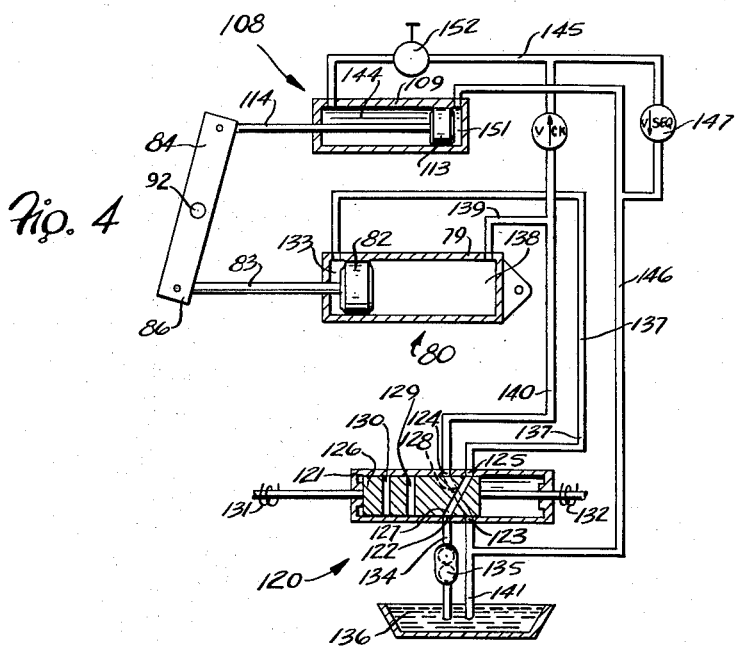

# United States Patent Office 3,003,472
Patented Oct. 10, 1961

3,003,472
QUILL ACTUATING AND CLAMPING
MECHANSIM
Robert M. Ferris, Hales Corners, and Denison C. Miller, Milwaukee, Wis., assignors to Kearney & Trecker Corporation, West Allis, Wis., a corporation of Wisconsin
Filed Sept. 14, 1959, Ser. No. 839,869
12 Claims. (Cl. 121—40)

This invention relates generally to machine tools and more particularly to an improved mechanism for advancing a movable member and having a clamping component which is automatically operable to effect a clamping of the movable member in the advanced position.

In many types of machining operations it is necessary to retract the cutter carrying movable member after a machining operation to space the cutter a slight distance from the workpiece during the idle return stroke in order to avoid marring the finished surface and then advance the cutter to a predetermined cutting position and clamp the cutter carrying movable member in the cutting position prior to initiating the succeeding machining operation. In still other types of machining operations it is necessary to make a rough cut first and then advance the cutter so that a second or finishing cut may be taken. It is essential that the cutter be positively and accurately held in the cutting position during the machining operation to insure that the dimensions being established by the machining operation will be consistently maintained for a plurality of workpieces operated upon in succession. In the past the advancement of the cutter carrying member to the cutting position has been accomplished by an independent mechanism while the clamping of the member was accomplished by another completely separate mechanism, each of which are individually controlled and operated in two distinct and separate steps.

It is therefore a general object of the present invention to provide an improved unitary advancing and clamping mechanism for actuating a movable member in its path of travel and clamping the movable member in a desired operating position.

Another object of the present invention is to provide an improved automatically operable mechanism for actuating and clamping a movable member in its path of travel.

Another object of the present invention is to provide a unitary mechanism capable of advancing a movable member of a machine tool to a desired operating position and of clamping the member in the advanced position as well as to effect the release and retraction of the member upon the completion of machining operation.

A further object of the present invention is to provide an improved actuating and clamping mechanism for a movable machine member that is extremely sturdy but simple in construction and efficient in operation.

According to this invention the improved actuating and clamping mechanism comprises a pair of fluid motors one of which has a floating cylinder operatively connected to a movable quill. The piston within the floating cylinder is provided with a piston rod that extends outwardly thereof and is pivotally connected to one end of a quill clamp actuating lever arm. The second fluid motor has its cylinder fixedly secured with the rod of the piston thereof extending outwardly of the cylinder and being pivotally secured to the opposite end of the quill clamp actuating arm. The two fluid motors are hydraulically interconnected in such a manner that when pressure is supplied to the rod side of the first of the fluid motors, a quantity of fluid is retained in the cylinder of the second of the fluid motors on the rod side of its piston, and by reason of the mechanical connection between the two piston rods, the piston of the first of the fluid motors will be maintained stationary. With the piston of the first of the fluid motors held stationary the floating cylinder thereof will move to effect a like movement of the quill. When the quill is fully advanced it prevents further movement of the floating cylinder. As pressure develops in the rod end of the first fluid motor its piston will move and thereby draw the piston of the second fluid motor outwardly of its associated cylinder, against back pressure created by a check valve interposed in the exhaust line. This action will effect a pivotal movement of the quill clamp actuating lever arm to effect a clamping of the quill in its fully advanced position. In order to retract the quill from its advanced position fluid pressure is supplied to the rod end of the second fluid motor and to the head end of the first fluid motor, thereby effecting movement of the quill clamp actuating lever arm in the opposite direction to release the quill. When the quill is unclamped, the piston of the second fluid motor will have been moved to its original start position preventing further movement of the piston of the first fluid motor. A build-up of pressure in the head end of the cylinder of the first fluid motor will then cause the cylinder to move to its original position and retract the quill therewith.

The foregoing and other objects of this invention, which will become more fully apparent from the following detailed description, may be achieved by the particular embodiment depicted in and described in connection with the accompanying drawings, in which:

FIG. 3 is an enlarged fragmentary detail view in vertical section taken along the plane represented by the line 3—3 in FIG. 1, showing the connection between the floating cylinder and the quill; and, FIG. 4 is a diagrammatic view of the hydraulic circuit.

Figure 1:
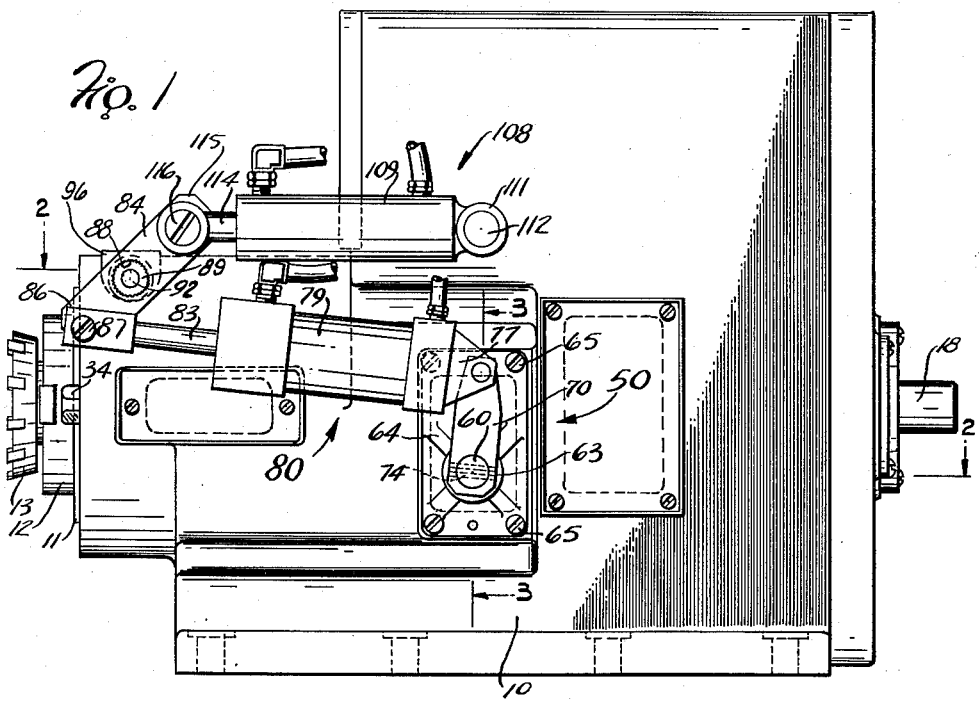
FIGURE 1 is a view in right side elevation of a machine tool head in which the present invention has been incorporated.
Figure 2:
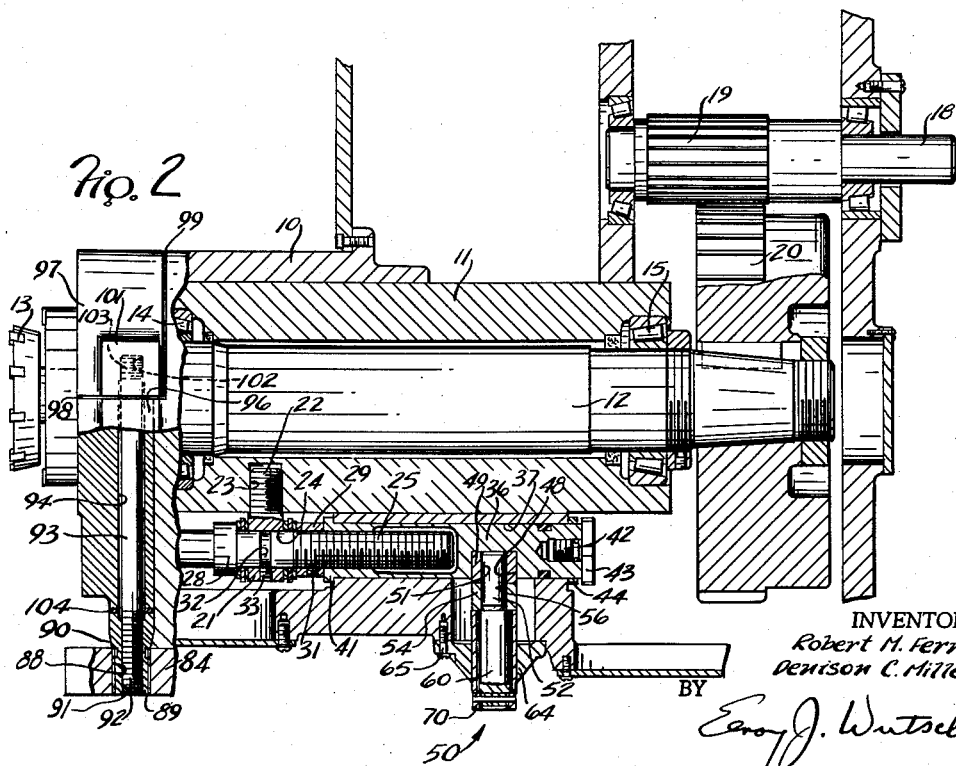
FIG. 2 is a view partly in plan and partly in horizontal section taken generally along the plane represented by the line 2—2 in FIG. 1, showing the arrangement of the quill clamping mechanism and the mechanism for advancing the quill.

Referring more specifically to the drawings, and particularly to FIGS. 1 and 2 thereof, a practical, operative embodiment of the present invention is there shown incorporated in a machine tool head, comprising a frame 10 in which a quill 11 is supported for axial movement. A spindle 12 having a cutter 13 secured to its outwardly extending end is journalled in the quill 11, being supported within the bore thereof by antifriction bearings 14 and 15. The quill is slidably supported in the frame 10 for axial movement to cause a like axial movement of the spindle 12 and its associated cutter 13.

Power for rotating the spindle 12 and thereby the cutter 13 is obtained from a suitable source (not shown) connected to rotate a shaft 18 and its associated elongated pinion 19 formed integrally with it. The pinion 19 has meshing engagement with a complementary gear 20 that is keyed to the rear extremity of the spindle 12. The gear 20 is secured to the spindle 12 to move with it, and as the spindle 12 is moved axially, the gear 20 will move with it relative to the pinion 19 but will remain in meshing engagement with the pinion 19 because of the length of the latter. The power is transmitted from the source (not shown) to drive the shaft 18 and its associated pinion 19, the latter, in turn, driving the gear 20 in any axial position thereof which operates to rotate the spindle 12 and its associated cutter 13. Axial movement of the spindle 12 therefore, will not disrupt the power train for driving the cutter 13.

The amount of movement of the spindle 12 may be predeterminately established by means of a positive stop mechanism comprising a bracket 21 having a shaft 22 which is engaged in a suitable radially extending opening 23 provided in the quill 11. The bracket 21 extends outwardly from the quill 11 and presents a bore 24 for receiving a screw 25 which is journalled therein for rotation relative to the bracket 21. Axial movement of the screw 25 in one direction relative to the bracket 21 is prevented by a collar 28 integrally formed on the screw 25 and disposed at one side of the bracket 21. A sleeve 29 mounted about the screw 25 and disposed on the opposite side of the bracket 21 is secured to the screw 25 by means of a set screw 31, to prevent axial movement of the screw 25 relative to the bracket 21 in the opposite direction. A portion of the screw 25 that is within the bracket 21 is provided with an annular groove 32 for receiving the end of a set screw 33 which is threaded through the bracket 21 to enter the bore 24 so that it may be tightened against the bottom surface of the groove 32 for the purpose of locking the screw 25 to the bracket 21 to prevent its rotation. The screw 25 may be rotated, by loosening the set screw 33, and applying a wrench to a squared end 34, shown in FIG. 1, formed on the outwardly extending end of the screw 25.

The opposite end of the screw 25 is threadedly engaged in an axial threaded bore formed in one end of a slide 36 which is located in a bore 37 formed in the frame 10 to slidably support the slide 36 for axial movement. The end of the slide 36 which receives the screw 25 is provided with a flange 41 disposed to engage against the frame at the leftward end of the bore 37 to establish the limit of rightward movement of the slide 36, as viewed in FIG. 2. The opposite end of the slide 36 threadedly receives an umbrella screw 42, the head 43 of which is of greater diameter than the diameter of the slide 36. The head 43 of the screw 42 cooperates with a washer 44 to establish the limit of leftward movement of the slide 36, as viewed in FIG. 2. The washer 44 encircles the slide 36 so that when the latter is moved in a leftward direction, as viewed in FIG. 2, the head 43 of the screw 42 will abut the washer 44 to precisely establish the limit of movement of the slide and thereby the quill 11 and its associated spindle 12.

Axial movement of the cutter 13 and locking it in a desired position is effected by a novel mechanism that is simple in construction but efficient in operation. As best seen in FIGS. 2 and 3, a vertical slot 48 is formed in the central portion of the slide 36 for the purpose of slidably receiving a block 49 which is arranged therein so as to move with the slide. The block 49 operates to receive one end of a crank mechanism, generally indicated by the reference numeral 50, by which means the quill 11 is advanced or retracted as the case may be. The block 49 includes a central bore 51 for receiving a pin 52 that is disposed to have one end 53 thereof extend outwardly of the block 49. An arm 54, the upper end 55 of which is provided with a bore 56 is snugly engaged on the extending end 53 of the pin 52, as clearly shown in FIG. 3. The lower end 57 of the arm 54 is provided with another bore 58 for receiving an extending end 59 of a pin 60. The pin 60 is journalled in a bearing sleeve 61 mounted within a bore 62 provided in a hub 63 of a supporting bracket 64. The supporting bracket 64 is secured to the frame 10 by means of screws 65 and serves both as a support for the pin 60 and as a cover plate for a recess 66 formed in the frame 10 in which the arm 54 is located.

The end 59 of the pin 60 is secured in the bore 58 of the arm 54 by means of a pin 67. It is apparent, therefore, that rotation of the pin 60 will operate to effect an arcuate movement of the upper end 55 of the arm 54 to cause a like arcuate movement of the pin 52 with its cooperating block 49. In order to move in the arcuate path, the block 49 will slide in the vertical slot 48 and at the same time will cause a horizontal rectilinear movement of the slide 36. Since the slide 36 is coupled to the quill 11, the latter will move with the slide in its horizontal movement to produce the desired axial movement of its associated spindle 12 for advancing or retracting the cutter 13.

To effect rotation of the pin 60 there is provided an actuating arm 70 which is provided at its lower end 71 with a bore 72 that receives the extending end 73 of the pin 60. The arm 70 is secured to the end 73 of the pin 60 by means of a pin 74, in well known manner. The opposite or upper end 76 of the arm 70 is contained between a pair of spaced apart axially extending lugs or ears 77 and 78 which are integrally formed on the end of a cylinder 79 of a fluid motor 80. The upper end 76 of the arm 70 is pivotally secured to the lugs 77 and 78 by means of a pin 81. With this arrangement, the motor 80 may be operated in a manner to be described, to pivot the arm 70 about the axis of the pin 60 to cause a rotational movement of the pin 60 in the same direction by reason of the connection between the lower end 71 of the arm 70 and the end 73 of the pin 60 by means of the pin 74.

The fluid motor 80 operates in a dual capacity of actuating the quill 11 and thereby the spindle 12 in the advancing and retracting movement, and, also, to effect clamping of the quill 11 in the advanced position. As shown in FIG. 1 and diagrammatically in FIG. 4, the fluid motor 80 comprises the cylinder 79, the right end of which, as viewed in FIG. 1, is pivotally connected to the upper end 76 of the arm 70, as previously described. The cylinder 79 reciprocally supports a piston 82 having a piston rod 83 that extends outwardly of the cylinder 79. The free end of the piston rod 83 is pivotally connected to one end 86 of a clamp actuating lever arm 84 as by a shoulder screw 87 threadedly engaged in the end 86 of the arm 84. At its mid-point, the actuating arm 84 is provided with a bore 88 having serrations therein for receiving a reduced serrated end portion 89 of an elongated nut 90, as shown in FIG. 2. The nut 90 is provided with an axial bore 91 having a left-hand thread therein. The threaded bore 91 of the nut 90 threadedly receives the left-hand threaded extending end 92 of a clamp rod 93. As shown in FIG. 2, the clamp rod 93 extends through a bore 94 provided in a transversely extending boss 96 integrally formed on the frame 10. The bore 94 in the boss 96 is of a slightly larger diameter than the diameter of the clamp rod 93 so as to permit axial movement of the rod within the bore 94.

The frame 10 adjacent to the cutter 13 has a portion 97 which is semidetached from the main body of the frame 10 as by a saw cut 98 which is parallel to the axis of the spindle 12 and a transverse saw cut 99. The saw cut 99 extends from the top of the frame 10, as viewed in FIG. 2, and extends downwardly approximately 90° to a juncture with the saw cut 98. The portion 97 formed by the saw cuts 98 and 99 remains attached to the main body of the frame at the end opposite of the saw cut 98. In this manner, the portion 97 constitutes a resilient band that encompasses approximately a quarter of the circumference of the quill 11. The portion 97 of the frame 10 is provided with a boss 101 which in effect is a continuation of the boss 96 but is separated therefrom by the saw cut 98. The boss 101 is provided with a threaded bore 102 which threadedly receives the inner extending threaded end 103 of the clamp rod 93.

A thrust washer 104 is mounted about the clamp rod 93 and is disposed between the end face of the nut 90 and the end face of the boss 96 so as to permit the nut 90 to rotate relative to the boss 96 and still provide for full axial bearing on the end face of the boss 96 by the nut 90. In operation, by reason of the left-hand threaded connection effected between the nut 90 and the clamp rod 93, the nut 90 when rotated in a counterclockwise direction, will be threaded onto the threaded end 92 of the clamp rod 93 to exert a force on the end face of the boss 96 through the thrust washer 104. This action tends to move the clamp rod 93 axially outwardly and thereby draw the free end of the frame portion 97 with it, or downwardly as viewed in FIG. 2. Movement of the free end of the frame portion 97 downwardly will operate to effect a tight engagement of the portion 97 with the quill 11 to clamp the quill in position.

To effect a releasing action, the nut 90 will be rotated in a clockwise direction to release the rod 93 for axial movement inwardly, or upwardly as viewed in FIG. 2, which, in turn, permits the frame portion 97 to resiliently return to its normal condition and thereby effect an unclamping of the quill 11. The nut 90 is threadedly rotated on the clamp rod 93 in the desired direction by a rotational movement of the clamp actuating lever arm 84 in the desired direction.

In order to effect a movement of the cylinder 79 leftwardly, as viewed in FIG. 1, relative to its piston 82 to thereby advance the quill 11 and its associated spindle 12 leftwardly, the piston 82 of the fluid motor 80 must be restrained from movement. To this end, we prefer to employ a second fluid motor 108, comprising a cylinder 109 having a mounting bracket 111 through which a shoulder screw 112 is inserted into threaded engagement with a suitable threaded opening (not shown) provided in the side of the frame 10 to pivotally secure the cylinder 109 in position on the frame 10. The cylinder 109 reciprocally supports a piston 113 having a piston rod 114. The outwardly extending end of the piston rod 114 is pivotally secured to the upper end 115 of the clamp actuating lever arm 84 by means of a shoulder screw 116. The fluid motor 108 normally acts to restrain the arm 84 from rotating in a counterclockwise direction, as viewed in FIGS. 1 and 4. In acting to restrain counterclockwise rotation of the arm 84, the fluid motor will serve to restrain the piston 82 of the fluid motor 80 from moving rightwardly relative to its associated cylinder 79, as viewed in FIG. 4, and, thus, renders the cylinder 79 capable of moving relative to the piston 82.

While the fluid motor 108 has been shown as the preferred method of accomplishing the results desired, it is to be understood that other means may be employed to this end, as for example, a tension spring of suitable strength. Such spring would have one end secured to the frame 10 and have its opposite end connected to the end 115 of the arm 84. The action would then be similar to the action of the fluid motor 108.

It is apparent that if fluid in the cylinder 109 of the fluid motor 108 on the rod side of the piston therein is prevented from exhausting therefrom, and simultaneously therewith fluid pressure is supplied to the cylinder 79 of the fluid motor 80 at the rod side of the piston thereof, the piston 113 of the motor 108 cannot move leftwardly, as viewed in FIG. 4, and vy virtue of the connection between the pistons 113 and 82 via the lever arm 84, the piston 82 will be held stationary. With the piston 82 maintained stationary, fluid pressure supplied to the cylinder 79 on the rod side of the piston will act to move the cylinder 79 to the left, as viewed in FIG. 4. On moving to the left the cylinder 79 will operate, through the crank mechanism 50 comprising the arm 70, shaft 60, arm 54 and pin 52, to advance the quill 11 and thereby the spindle 12 to the left.

The amount of leftward or advancing movement of the quill will be limited by the spacing between the washer 44 and the head 43 of the umbrella screw 42. Thus, when the head 43 of the screw 42 engages the washer 44 the latter serves as a positive stop and further movement is terminated to limit the axial distance that the cutter 13 can be advanced and the cylinder 79 can no longer continue to move leftwardly. Then, if fluid pressure is continued to be supplied to the cylinder 79 at the rod side of the piston thereof, and the fluid in the cylinder 109 at the rod side of the piston is permitted to exhaust therefrom against a back pressure, the piston 82 of the fluid motor 80 will move to the right relative to its now stationary cylinder 79. This will serve to draw the piston 113 of the fluid motor 108 to the left and cause a rotation of the lever arm 84 in a counterclockwise direction, as viewed in FIG. 4, to effect a clamping of the quill 11 in the advanced or extended position.

In a retracting operation, fluid pressure will be supplied to the cylinder 109 at the rod side of the piston and simultaneously therewith to the cylinder 79 at the head side of the piston thereof moving the piston 113 to the right and the piston 82 to the left and by virtue of the mechanical connection of the two pistons via the lever arm 84 to effect unclamping of the quill 11. When unclamping has been accomplished, the piston 113 in the cylinder 109 will have been moved its full distance of travel while the piston 82 of the cylinder 79 will have been moved relative to its associated cylinder 79 to a position intermediate of the ends of the cylinder 79, since the cylinder 79 is still in a leftward position. With the piston 113 of the fluid motor 108 in a full rightward position relative to its cylinder 109 the piston 82 of the fluid motor 80 will be maintained stationary relative to its cylinder 79. As fluid pressure is continued to the head side of the piston 82 of the fluid motor 80 the cylinder 79 will move to the right, as viewed in FIG. 4. Rightward movement of the cylinder 79 will operate to pivot the arm 70 to rotate its cooperating pin 60 in a direction to retract the quill 11 and its associated cutter carrying spindle 12.

The hydraulic circuit for selectively supplying fluid pressure to the fluid motors 80 and 108 is diagrammatically shown in FIG. 4. As there shown, a hydraulic valve 120 comprising a valve body 121 having four ports 122, 123, 124 and 125 is provided to selectively direct fluid pressure to the motors 80 and 108 for controlling their operational sequence. A plunger 126 is movably contained within the valve body 121 and is selectively positionable to either a leftward or rightward position, as viewed in FIG. 4. The plunger 126 is provided with passages 127, 128, 129 and 130 which serve to pass fluid therethrough. When the plunger 126 is in its leftward position, as shown in FIG. 4, it serves to connect the ports 122 and 125 together via the passage 127 in the plunger and will connect the ports 123 and 124 together via the passage 128. When the plunger is moved to a rightward position it will operate to connect the ports 122 and 124 together via the passage 130 and connect the ports 123 and 125 together via the passage 129.

The plunger 126 is actuated leftwardly by energizing a solenoid 131 operably connected to move the plunger. Movement of the plunger 126 to a rightward position is effected by energizing a solenoid 132 operably connected to the right end of the plunger 126, as viewed in FIG. 4. In the leftward position, as shown in FIG. 4, the plunger operates to direct fluid pressure, supplied to the inlet port 122 of the valve 120 through a supply line 134 and a pump 135 from a suitable reservoir 136, into a line 137 via the inlet port 122, the passage 127 in the plunger 126 and the port 125. The line 137 is connected to a chamber 133 on the rod side of the fluid motor 80. Meanwhile, fluid in a chamber 138 on the head side of the piston 82 of the fluid motor 80 is free to exhaust to the reservoir 136 via a branch line 139, a line 140 connected to the port 124 of the valve, the passage 128 in the plunger 126 in registration with the outlet port 123 of the valve and connected to a return line 141.

As fluid pressure is being supplied to the chamber 133 of the motor 80, the fluid in a chamber 144 on the rod side of the piston 113 of the fluid motor 108 is prevented from exhausting through a line 145, which is connected to the chamber 144 and a fluid return line 146, by operation of a check valve 147 interposed in the line 145. The check valve 147 is set to open at a higher pressure than is required to operate the fluid motor 80. Since fluid in the chamber 144 of the motor 108 is prevented from exhausting therefrom, the piston 113 of the motor will be maintained stationary. With the piston 113 maintained stationary, and by reason of the mechanical linkage of the piston 113 with the piston 82 through the arm 84, the piston 82 of the fluid motor 80 will be maintained stationary. Therefore, fluid pressure supplied to the chamber 133 of the motor 80 will serve to move the cylinder 79 leftwardly relative to the piston 82. Leftward movement of the cylinder 79 operates to advance the quill 11 and thereby the spindle 12 and cutter 13.

Since the present embodiment of the invention is shown with a precision spindle head, the location of the cutter 13 when in its advanced position is of the utmost importance, and it must be moved to this position with extreme accuracy. Therefore, a predetermined desired position of advancement is established by the abutment of the head 43 of the screw 42 with the washer 44, with the cylinder 79 moving leftwardly to advance the quill 11 until the head 43 of the screw 42 is moved into tight engagement with the washer 44.

When the head 43 of the screw 42 is in tight engagement with the washer 44, leftward movement of the cylinder 79 will be stopped and the cylinder will now be maintained stationary. At this time the piston 82 of the fluid motor 80 will be located in a position intermediate of the ends of the cylinder 79. As pressure in the chamber 133 builds-up, the piston 82 will be forced to move to the right, as viewed in FIG. 4, moving the piston 113 to the left against the back pressure created by the valve 147. This action operates to rotate the clamp actuating arm 84 in a counterclockwise direction to effect a clamping of the quill 11 in the advanced position, as previously described.

In an unclamping operation the solenoid 132 is energized to move the plunger 126 to a rightward position within the valve body 121. In this position fluid pressure from the reservoir 136 will be directed from the inlet port 122 through the plunger 126 via the passage 130 to the port 124. Fluid pressure from the port 124 will flow into the line 140 and flow via the line 139 into the chamber 138 of the fluid motor 80. Fluid pressure will also be directed into the line 145 to the chamber 144 of the fluid motor 108. Fluid pressure in the chambers 138 and 144 of the motors 80 and 108, respectively, will act to move the associated pistons in opposite directions. The piston 82 will be moved to the left, while the piston 113 will be moved to the right, as viewed in FIG. 4. This action will effect clockwise rotation of the clamp actuating arm 84 to unclamp the quill. A chamber 151 on the head side of the piston is directly connected to the reservoir 136 by means of the return line 146 for exhausting the fluid in the chamber 151 while the piston 113 is moving to the right. At this time the chamber 133 of the fluid motor 80 is connected to the reservoir 136 through the line 137, the passage 129 of the rightwardly positioned plunger 126 and the return line 141.

When the quill 11 is unclamped the piston 82 of the fluid motor 80 will have been moved relative to its cylinder 79 to a position intermediate the ends thereof with the cylinder 79 still being in a leftward position. With the quill 11 unclamped the fluid pressure in the chamber 144 of the fluid motor 108 will maintain the piston 113 thereof stationary which will operate to maintain the piston 82 of the fluid motor 80 stationary relative to its cylinder 79. Thereupon, continued fluid pressure to the chamber 138 of the fluid motor 80 will cause the cylinder 79 to move to the right. Movement of the cylinder 79 to the right will operate to pivot the arm 70 to cause a rotation of the pin 60 and thereby effect a movement of the quill 11 and its associated spindle 12 and cutter 13 to the right to a retracted position.

The amount that the quill 11 may be advanced in moving the cutter 13 to an operating position may be predeterminately set by manipulating the screw 25 through its square end 34, shown in FIG. 1. When setting up the machine to perform the desired operation, a shut-off valve 152 interposed in the line 145 is closed. With the valve 152 closed the solenoid 131 may be energized to direct fluid pressure to the chamber 133 of the fluid motor 80 to cause the cylinder 79 to move to the left thereby advancing the quill 11 and the associated spindle 12 and cutter 13. When the head 43 of the screw 42 engages the washer 44 the cylinder 79 will then be maintained stationary, as previously described. Since the valve 152 is closed, fluid in the chamber 144 of the fluid motor 108 will be positively locked in the chamber to prevent the actuation of the quill clamping mechanism. The desired extended position of the cutter may then be accurately established by rotating the screw 25 to effect axial movement of the quill 11 and thereby move the cutter 13 outwardly or inwardly of the frame 10 as may be desired. Such movement will be produced because rotation of the screw 25 will cause it to move axially relative to the slide 36 since the slide 36 is prevented from moving because of its connection to the now stationary cylinder 79 through the crank mechanism 50. The quill 11 will therefore move with the screw 25 by reason of its connection therewith through the bracket 21. Movement of the quill 11 produces like movement of the spindle 12 and the cutter 13 to adjust the axial position of the cutter. When the advancing and clamping mechanism is subsequently operated, the cutter 13 will always be accurately advanced to its thus established advanced position by reason of the abutment of the head 43 of the screw 42 with the washer 44.

From the foregoing detailed description of an explanation of the operation of the exemplifying advancing and clamping mechanism herein set forth as a practical embodiment of the present invention, it will be apparent that there has been provided an improved actuating and clamping mechanism for advancing and retracting a movable member, which is capable of clamping the movable member in the advanced position.

Although the illustrative embodiment of the invention has been described in considerable detail for the purpose of disclosing a practical operative structure whereby the invention may be practiced advantageously, it is to be understood that the particular apparatus described is intended to be illustrative only, and that the various novel characteristics of the invention may be incorporated in other structural forms without departing from the spirit and scope of the invention as defined in the subjoined claims.

The principles of this invention having now been fully explained in connection with the foregoing description, we hereby claim as our invention:

1. In a retracting mechanism for a movable member of a machine tool; a frame; a source of hydraulic pressure; a cylinder supported on said frame for axial movement and connected to receive hydraulic pressure from said source; a piston slidably supported within said cylinder for axial movement; coupling means operably connecting said cylinder to the movable member so that axial movement of said cylinder in one direction will cause a movement of the movable member to an advanced position and axial movement of said cylinder in the opposite direction will cause a retraction of the movable member from its advanced position; clamping means operable when actuated to clamp the movable member in its advanced position, said clamping means being connected to be actuated by the axial movement of said piston; and restraining means operably connected to oppose the axial movement of said piston but arranged to yield upon the application of a predetermined force to allow said piston to be moved axially to actuate said clamping means; whereby the flow of hydraulic pressure into said cylinder will cause the cylinder to move axially relative to said piston to move the movable member to its advanced position and after the movable member has been located in its advanced position the continued flow of pressure into said cylinder will increase the force on said piston to overcome the opposition of said restraining means and cause axial movement of said piston to actuate said clamping means for clamping the movable member in its advanced position.

2. In a retracting mechanism for a movable member of a machine tool; a source of hydraulic pressure; a hydraulic motor having two actuating elements movable relative to each other, said hydraulic motor being connected to receive energizing pressure from said source with the pressure being applied to both of said actuating elements so that the force tending to move either of said elements will react against the other element; coupling means operably connecting the first of said actuating elements to the movable member so that movement of said first element in one direction will cause a movement of the movable member to an advanced position and movement of said first element in the opposite direction will cause a retraction of the movable member from its advanced position; clamping means operable when actuated to clamp the movable member in its advanced position, said clamping means being connected to be actuated by the movement of said second actuating element; and restraining means operably connected to oppose the movement of said second element but arranged to yield upon the application of a predetermined force to allow said second element to be moved to actuate said clamping means; whereby the flow of hydraulic pressure to said motor will cause said first actuating element to move relative to said second actuating element to move the movable member to its advanced position and after the movable member has been located in its advanced position the continued flow of pressure to said motor will develop a force on said second element to overcome the opposition of said restraining means and cause a movement of said second actuating element to actuate said clamping means for clamping the movable member in its advanced position.

3. In a mechanism for actuating a movable machine member; a frame; a source of hydraulic pressure; a first cylinder supported on said frame for axial movement and connected to receive hydraulic pressure from said source; a first piston slidably supported within said first cylinder for axial movement; coupling means operably connecting said first cylinder to the movable member so that axial movement of said first cylinder in one direction will cause a movement of the movable member to an advanced position and axial movement of said first cylinder in the opposite direction will cause a retraction of the movable member from its advanced position; clamping means actuatable to clamp the movable member in its advanced position, said clamping means being connected to be actuated by the axial movement of said first piston; a second cylinder carried by said frame and connected to receive hydraulic pressure from said source; a second piston slidably contained within said second cylinder and connected to move together with said first piston; an exhaust line connected to said second cylinder to carry the exhaust fluid from said second cylinder when said second piston is moving with said first piston as the latter is moving in a direction to actuate said clamping means; and a normally closed valve in said exhaust line to stop the flow of exhaust fluid from said first cylinder and thereby prevent the movement of said second piston and its associated first piston, said valve being arranged to open upon the application of a predetermined pressure; whereby the flow of hydraulic pressure to said first cylinder will cause said first cylinder to move relative to said first piston to move the movable member to its advanced position whereupon the continued flow of pressure to said first cylinder will develop a force on said first piston which is transmitted to said second piston to increase the exhaust pressure in said second cylinder until said exhaust valve is opened to release the exhaust fluid from said cylinder and permit the movement of both of said pistons to actuate said clamping means for clamping the movable member in its advanced position.

4. In a mechanism for actuating and clamping a movable member of a machine tool; a frame; a clamping mechanism carried by said frame and operably connected to engage the movable member in a clamping action; a lever arm pivotally supported by said frame at a point intermediate its ends and connected to said clamping mechanism so that it is operable when pivoted in one direction to actuate said clamping mechanism in a clamping action, said lever arm being operable when pivoted in the opposite direction to actuate said clamping mechanism in a releasing action; a crank mechanism supported by said frame and operably connected to move said movable member when actuated; a first fluid motor comprising a cylinder operably connected to said crank mechanism so that movement of said cylinder will actuate said crank mechanism for producing a movement of the movable member; a piston reciprocally supported in said cylinder, said piston being provided with a piston rod extending outwardly of the associated cylinder and pivotally connected to one end of said lever arm; a second fluid motor comprising a second cylinder fixedly secured to said frame; a second piston reciprocally supported in said second cylinder, said second piston being provided with a piston rod extending outwardly of the associated cylinder and pivotally connected to the opposite end of said lever arm; a source of fluid pressure; a hydraulic circuit connecting said source to said first and second fluid motors; a selection valve in said circuit and operable in one position to direct fluid to the rod side of said first fluid motor; an exhaust line connected to carry exhaust fluid from said second fluid motor; and a sequence valve in said exhaust line operable to prevent fluid on the rod side of said second motor from exhausting therefrom when fluid pressure is directed to the rod side of said first fluid motor to prevent movement of said second piston which operates by means of the mechanical connection between said two pistons to prevent movement of said first piston to thereby effect axial movement of said first cylinder to actuate said crank mechanism and thereby advance said movable member, said sequence valve operating to permit fluid in the rod end of said second fluid motor to exhaust therefrom upon continued fluid pressure to the rod side of said first fluid motor after the movable member has been advanced to thereby permit the pistons of said fluid motors to actuate said lever arm in one direction to operate said clamping mechanism to engage said movable member in a clamping action.

5. In mechanism for actuating and clamping a movable member of a machine tool; a frame; a clamping mechanism carried by said frame and operably connected to engage the movable member in a clamping action when actuated; an actuating member for said clamping mechanism operable in one direction to actuate said clamping mechanism in a clamping action, said actuating member being operable when operated in the opposite direction to actuate said clamping mechanism in a releasing action; a crank mechanism supported by said frame and having one end thereof connected to the movable member to effect a movement of the movable member when actuated; a first piston and cylinder motor having the piston thereof pivotally connected to said clamp mechanism actuating member, said cylinder being pivotally connected to the opposite end of said crank mechanism so that movement of the cylinder will serve to actuate said crank mechanism for effecting a movement of the movable member; a second piston and cylinder motor having its piston pivotally connected to said clamp mechanism actuating member in an opposing operating condition relative to the piston of said first motor; said cylinder of said second motor being secured to said frame to render it axially immovable; a source of fluid pressure connected to said motors; a direction valve connected between said motors and said source and operable to selectively direct fluid pressure from said source to one end of said first motor; an exhaust line connected to carry the exhaust fluid from said second motor; and a pressure operated sequence valve connected in said exhaust line and which is normally closed until a minimum pressure is developed in said exhaust line so that it prevents the exhaustion of fluid from said second motor to prevent the movement of the piston within the cylinder of said second motor and thereby prevents the movement of the piston in said first motor by reason of the interconnection of the two pistons through said clamp mechanism actuating member so that upon the admission of pressure into the cylinder of said first fluid motor the cylinder will move relative to its stationary piston to actuate said crank mechanism for effecting an advancing movement of the movable member, and upon the continued admission of fluid pressure into the cylinder of said first motor sufficient pressure will develop on its associated piston which will be transmitted to the piston of said second motor through their interconnection to overcome the resistance of said sequence valve causing it to open and thereby admit the flow of fluid through said exhaust line to enable both of the pistons to move within their associated cylinders for actuating said clamp mechanism actuating member in a direction to effect a clamping of the movable member in the advanced position, said direction valve being conditionable to direct fluid pressure from said source to the opposite end of said first motor and to the end of said second motor wherein said sequence valve maintained a back pressure to thereby effect movement of the pistons to move said clamp mechanism actuating member in the opposite direction to release said clamping mechanism, the piston of said second motor travelling its full stroke during a releasing action to its limit of movement whereupon continued fluid pressure to said motors will serve to effect movement of the cylinder of said first motor in the opposite direction to retract the movable member.

6. In a mechanism for actuating and clamping a movable member of a machine tool; a frame; a clamping mechanism carried by said frame and operably connected to engage the movable member in a clamping action when actuated; an actuating arm pivotally supported by said frame at a point intermediate its ends and connected to said clamping mechanism so that it is operable when pivoted in one direction to actuate said clamping mechanism in a clamping action, said actuating arm being operable when pivoted in the opposite direction to actuate said clamping mechanism in a releasing action; a first fluid motor comprising a floating cylinder having one end pivotally connected to the movable member so that axial movement of said floating cylinder will operate to effect axial movement of the movable member; a working piston in said floating cylinder having a piston rod extending outwardly of the associated cylinder and pivotally connected to one end of said clamping mechanism actuating arm; a second fluid motor comprising a cylinder having one end pivotally secured to said frame; a working piston in said cylinder of said second fluid motor having a piston rod extending outwardly of its associated cylinder and pivotally connected to the opposite end of said clamping mechanism actuating arm; a source of fluid pressure connected to said motors; a direction selection valve connected between said source of fluid pressure and said motors and operable when in a first condition to direct fluid pressure from said source to the rod end of the cylinder of said first fluid motor or when in a second condition to direct fluid pressure to the head end of the cylinder of said first fluid motor and to the rod end of the cylinder of said second fluid motor; an exhaust line connected to carry exhaust fluid from the rod end of said cylinder of said second fluid motor; and a normally closed pressure operated sequence valve connected in said exhaust line operating to prevent the exhaustion of fluid from said second fluid motor until a minimum pressure is developed in said exhaust line to prevent movement of said piston within said cylinder of said second fluid motor and thereby prevent movement of said piston of said first fluid motor by reason of the interconnection of the two pistons through said clamping mechanism actuating arm so that fluid pressure to the rod end of said floating cylinder of said first fluid motor will effect movement of said floating cylinder relative to its associated piston and thereby effect an advancing movement of the movable member, and upon the continued admission of fluid pressure to the rod end of the floating cylinder of said first fluid motor a sufficient pressure will be developed on its associated piston which will be transmitted to said piston of said second fluid motor through their interconnection to increase the pressure in said exhaust line and thereby effect an opening of said sequence valve to permit the flow of fluid through said exhaust line to enable both of said pistons to move within their associated cylinders for actuating said clamping mechanism actuating arm in a direction to effect a clamping of the movable member in the advanced position, said direction selection valve when in its second condition operating to direct fluid pressure to the head end of the floating cylinder of the first fluid motor and to the rod end of the cylinder of said second fluid motor to act on both of said pistons to effect their movement within their associated cylinders and thereby actuate said clamping mechanism actuating arm in the opposite direction to effect a release of said clamping mechanism, and thereafter fluid pressure to the rod end of the cylinder of said second fluid motor will serve to maintain its associated piston stationary in its retracted position to effectively maintain said piston of said first fluid motor stationary by reason of the interconnection between said pistons and continued fluid pressure to the head end of said floating cylinder will cause said floating cylinder to return to its original position relative to its associated piston and in so moving will operate to retract the movable member.

7. In mechanism for actuating and clamping a movable member of a machine tool; a frame; a clamping mechanism supported by said frame and operably connected to engage the movable member in a clamping action when actuated; a movable actuating member supported by said frame and operably connected to said clamping mechanism to actuate it in a clamping or unclamping action, said actuating member having oppositely extending arms; a crank mechanism supported by said frame and operably connected to said movable member to advance or retract the member; a fluid motor comprising a floating cylinder operably connected to said crank mechanism so that movement of said cylinder will actuate said crank mechanism for producing a movement of the movable member; a working piston in said floating cylinder having a piston rod connected to the end of one of said arms of said clamping mechanism actuating member; a restraining member connected to said frame and to the end of the other of said arms of said clamping mechanism actuating member, said restraining member normally acting to prevent movement of said actuating member; a source of fluid pressure connected to said fluid motor; and a two position direction valve connected between said source and said motor and operable in one position to direct fluid pressure to the rod end of said floating cylinder which acts to effect movement of said floating cylinder relative to its associated piston which is held stationary by the normal action of said restraining member to thereby effect advancement of the movable member, and continued fluid pressure to the rod end of said floating cylinder after the movable member has been advanced will effect a build up of pressure in the rod end of said floating cylinder which acts upon said piston thereof to overcome the normal action of said restraining member and operates to move said piston relative to its associated floating cylinder thereby moving said actuating arm in a direction to operate said clamping mechanism in a clamping operation, said direction valve being operable in its second position to direct fluid pressure to the head side of said floating cylinder to effect movement of said associated piston relative to its associated floating cylinder in the opposite direction and move said clamping mechanism actuating member in a direction to operate said clamping mechanism in a releasing action and return said restraining member to its normal acting condition, and continued fluid pressure to the head side of said floating cylinder after said clamping mechanism has been actuated to a release condition will operate to move said floating cylinder to its initial position to thereby retract said movable member.

8. In a mechanism for actuating and clamping a movable member of a machine tool; a frame; a clamp mechanism supported by said frame and operably connected to engage the movable member in a clamping action; an actuating member pivotally supported by said frame and connected to said clamp mechanism so that it is operable when pivoted in one direction to actuate said clamp mechanism in a clamping action, said actuating member being operable when pivoted in the opposite direction to actuate said clamp mechanism in a releasing action; a first fluid power means comprising a first element and a second element adapted to be movable relative to each other, said first element being connected to the movable member so that movement of said first element will produce a movement of the movable member, said second element being connected to said actuating member at a point removed from the pivot point of said actuating member; a second fluid power means comprising a fixed first element and a movable second element; said first element of said second power means being secured to said frame, said second element of said second power means being connected to said actuating member at a point removed from the pivot point of said actuating member; a source of fluid pressure; a hydraulic circuit connecting said source to said first and second power means; a selection valve in said circuit and operable to selectively direct fluid pressure from said source to said first power means; an exhaust line connected to carry the exhaust fluid from said second power means; and a normally closed pressure operated sequence valve connected in said exhaust line, said valve being closed until a minimum pressure is developed in said exhaust line so that it prevents the exhaustion of fluid from said second power means to prevent the movement of the movable element thereof and thereby prevents the movement of the second element of said first power means by reason of the interconnection of the second element of said first power means and the second element of said second power means through said actuating member so that upon admission of fluid pressure to said first power means the first element thereof will move relative to its second element to effect advancement of the movable member, and upon continued admission of fluid pressure to said first power means sufficient pressure will develop on said second element of said first power means which will be transmitted to said movable second element of said second power means through their interconnection to develop a minimum pressure in said exhaust line to overcome the resistance of said sequence valve causing it to open and thereby permit exhaust fluid to flow from said second power means to enable said second element of said first power means and second element of said second power means to move relative to their associated elements for pivoting said actuating member in a direction to effect a clamping of the movable member in the advanced position, said direction valve being conditionable to direct fluid pressure from said source to said first and second power means for a reversal of operation of said power means to effect movement of said second element of said second power means and said second element of said first power means to pivot said clamp mechanism actuating member in the opposite direction to release said clamp mechanism, the second element of said second power means moving its limit of travel during a releasing action whereupon continued fluid pressure to said power means will serve to maintain said second element of said first power means stationary and effect movement of said first element of said first power means in the opposite direction to retract the movable member.

9. In a mechanism for actuating and clamping an axially movable quill of a machine tool; a frame; a clamp mechanism supported by said frame and operably connected to engage the quill in a clamping action when actuated; a movable actuating member having oppositely extending arms supported by said frame and connected to said clamp mechanism to actuate it, said actuating member being operable when moved in one direction to actuate said clamp mechanism in a clamping action and when moved in the opposite direction to actuate said clamp mechanism in a releasing action; a crank device supported by said frame and connected to effect advancement or retraction of said quill; a first cylinder connected to said crank device and operable when moved in one direction to operate said crank device for advancing said quill; a working piston in said first cylinder having a piston rod, said piston rod being connected to the end of one of said arms of said clamp mechanism actuating member; a second cylinder secured to said frame; a working piston reciprocally supported in said second cylinder and having a piston rod connected to the end of the other of said arms of said clamp mechanism actuating member; a source of fluid pressure connected to said cylinders; a direction valve connected between said cylinders and said source and operable in one condition to direct fluid pressure to one end of said first cylinder; and means operably connected to maintain said piston of said second cylinder stationary within its associated cylinder, said means being conditionable to a state wherein said piston of said second cylinder is freed to move within its associated cylinder, the conditioning of said means being dependent upon a pressure build up in the end of said first cylinder, said piston of said second cylinder when maintained stationary operating through said clamp mechanism actuating member to maintain the piston of said first cylinder stationary so that fluid pressure to the end of said first cylinder serves to effect movement of said first cylinder to operate said crank device for advancing the quill, and continued fluid pressure to the end of said first cylinder after advancement of the quill will effect a build up of pressure therein to effect conditioning of said means to permit said piston of said second cylinder to move within its associated cylinder and the pressure on the piston of said first cylinder will act to effect its movement and by reason of their interconnection both pistons will move within their associated cylinders to thereby operate said actuating member in a direction to effect engagement of said clamp mechanism with said quill in a clamping action.

10. In a mechanism for advancing and clamping a movable member of a machine tool; a frame; a clamp mechanism supported by said frame and operably disposed to engage the movable member in a clamping action when actuated; an actuating member operably connected to said clamp mechanism and operable when moved in one direction to operate said clamp mechanism in a clamping action and when moved in the opposite direction to effect a release of said clamp mechanism; a crank operably connected to effect an advancement and retraction of the movable member; power means connected to operate said crank and said clamp mechanism actuating member; means for controlling the operation of said power means to thereby establish the order in which said crank and said clamp mechanism actuating member will be actuated; and yieldable means operably connected to said clamp mechanism actuating member to restrain it from moving when said crank is actuated in a movable member advancing action, said yieldable means being overpowered by said power means when said power means has operated to actuate said crank in a movable member advancing action to thereby permit said clamp mechanism actuating member to operate to engage said clamp mechanism with the movable member in a clamping action; whereby the movable member will be first advanced and thereafter clamped in the advanced position.

11. In mechanism for actuating and clamping a movable member of a machine tool; a frame; clamping means carried by said frame and actuatable into clamping and unclamping engagement with the movable member; an actuating member carried by said frame and connected to said clamping means, said actuating member being operable when moved in one direction to actuate said clamping means in a clamping action and when moved in the opposite direction to effect a release of clamping action; a crank supported by said frame and having one end connected to the movable member to advance and retract the member; power means connected to the opposite end of said crank to actuate it, said power means being also connected to said clamping means actuating member to actuate it; control means operably connected to effect operation of said power means to operate said crank in a direction to advance the movable member; and restraining means operably connected to said clamping means actuating member and normally acting to restrain said actuating member from moving as said power means operates said crank to advance the movable member, said power means operating after advancement of the movable member to overcome said restraining means and move said clamping means actuating member in a direction to effect operation of said clamping means in a clamping action to thereby clamp the movable member in the advanced position, said control means being also operable to effect operation of said power means in a manner to actuate said clamping means actuating member in the opposite direction to effect an unclamping of the movable member while maintaining said crank stationary, and thereafter effecting operation of said crank in the opposite direction to retract the movable member.

12. In a machine tool having a frame in which a movable member is supported; a clamp mechanism supported by said frame and operably connected to be engageable with the movable member to clamp it; an actuating member operably connected to said clamp mechanism and operable when moved in one direction to actuate said clamp mechanism in a clamping action, said actuating means being operable when moved in the opposite direction to effect a release of the clamping action of said clamp mechanism; a crank supported by said frame and having one end connected to the movable member to advance and retract it; an adjustable positive stop carried by the frame and disposed to be engaged by the movable member to define the limit to which the movable member may be advanced, said positive stop also having means engageable by the movable member to define the limit to which the movable member may be retracted; power means connected to the opposite end of said crank to actuate it, said power means being also operably connected to said clamp mechanism actuating member to effect its movement; control means operably connected to effect operation of said power means to operate said crank in a direction to advance the movable member; and restraining means operably connected to said clamp mechanism actuating member and normally acting to restrain said actuating member from moving as said power means operates said crank to advance the movable member, said power means operating after completing the advancement of the movable member to overpower said restraining means and move said clamp mechanism actuating member in a direction to effect operation of said clamp mechanism in a clamping action to thereby clamp the movable member in the advanced position, said control means being also operable to effect operation of said power means to move said clamp mechanism actuating member in the opposite direction to release the movable member while maintaining said crank stationary and thereafter effecting operation of said crank in the opposite direction to retract the movable member.

References Cited in the file of this patent
UNITED STATES PATENTS

| | | |
|---|---|---|
| 2,615,372 | Coffin | Oct. 28, 1952 |
| 2,633,061 | Roehm et al. | Mar. 31, 1953 |
| 2,832,200 | Grout et al. | Apr. 29, 1958 |
| 2,867,154 | Hutchens et al. | Jan. 6, 1959 |
| 2,891,514 | Moeller | June 23, 1959 |